(12) United States Patent
Babu et al.

(10) Patent No.: US 12,294,510 B2
(45) Date of Patent: *May 6, 2025

(54) METHOD AND APPARATUS FOR TELEMETRY MONITORING OF BGP PREFIXES IN A NETWORK TOPOLOGY

(71) Applicant: Arrcus Inc., San Jose, CA (US)

(72) Inventors: Lakshman Swaroop Babu, Danville, CA (US); Ting-Chi Yeh, Milpitas, CA (US); Alpesh Patel, San Ramon, CA (US); Keyur Patel, San Jose, CA (US)

(73) Assignee: Arrcus Inc., San Jose, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 18/084,845

(22) Filed: Dec. 20, 2022

(65) Prior Publication Data

US 2024/0205130 A1  Jun. 20, 2024

(51) Int. Cl.
*H04L 45/02* (2022.01)

(52) U.S. Cl.
CPC ................ *H04L 45/02* (2013.01)

(58) Field of Classification Search
CPC ....................................... H04L 45/02
USPC ................................................ 709/223
See application file for complete search history.

(56) References Cited

U.S. PATENT DOCUMENTS

| 8,891,522 B2 * | 11/2014 | Fletcher | H04L 12/4633 |
| | | | 709/217 |
| 10,419,328 B1 * | 9/2019 | Dave | H04L 45/04 |
| 10,761,813 B1 | 9/2020 | Echeverria | |
| 10,775,976 B1 | 9/2020 | Abdul-Jawad | |
| 10,776,441 B1 | 9/2020 | Echeverria | |
| 11,477,288 B1 | 10/2022 | Singh et al. | |
| 2006/0106941 A1 | 5/2006 | Singhal | |
| 2006/0123477 A1 | 6/2006 | Raghavan | |
| 2006/0146991 A1 | 7/2006 | Thompson | |
| 2015/0326441 A1 * | 11/2015 | Smith | H04L 45/125 |
| | | | 370/255 |
| 2015/0326444 A1 * | 11/2015 | Smith | H04L 12/6418 |
| | | | 370/254 |
| 2018/0167476 A1 | 6/2018 | Hoffner | |
| 2018/0262454 A1 | 9/2018 | Zandi et al. | |
| 2018/0262585 A1 | 9/2018 | Zandi et al. | |
| 2018/0262592 A1 | 9/2018 | Zandi et al. | |
| 2018/0316639 A1 | 11/2018 | Cullen | |
| 2019/0182266 A1 * | 6/2019 | Doron | H04L 63/145 |
| 2019/0230011 A1 | 7/2019 | Gandham | |
| 2019/0230112 A1 | 7/2019 | Gandham | |
| 2019/0230127 A1 | 7/2019 | Gandham | |

(Continued)

*Primary Examiner* — Anthony Mejia
(74) *Attorney, Agent, or Firm* — David R. Stevens; Stevens Law Group

(57) ABSTRACT

Telemetry monitoring of BGP prefixes in a network topology. A system includes a plurality of input topic streams and a plurality of processors, wherein each of the plurality of processors is dedicated to one or more of the plurality of input topic streams. The system includes a plurality of stream stores for storing data, wherein each of the plurality of stream stores is dedicated to one or more of the plurality of input topic streams. The system includes a route processor in communication with each of the plurality of stream stores, wherein the route processor determines whether a route for a network topology corresponds with an existing route stored on at least one of the plurality of stream stores.

16 Claims, 10 Drawing Sheets

(56) References Cited

U.S. PATENT DOCUMENTS

| | | |
|---|---|---|
| 2020/0007435 A1 | 1/2020 | Paida et al. |
| 2020/0065141 A1 | 2/2020 | Pai et al. |
| 2020/0068014 A1 | 2/2020 | Sarker et al. |
| 2020/0162371 A1* | 5/2020 | Musku .................... H04L 45/04 |
| 2020/0351188 A1 | 11/2020 | Arora et al. |
| 2021/0067450 A1 | 3/2021 | Hanes et al. |
| 2021/0092068 A1 | 3/2021 | Ismailsheriff et al. |
| 2021/0144095 A1 | 5/2021 | Hanes et al. |
| 2021/0250228 A1 | 8/2021 | Prakash et al. |
| 2021/0377174 A1 | 12/2021 | Gulrajani et al. |
| 2022/0269727 A1 | 8/2022 | Batsakis |
| 2022/0303208 A1 | 9/2022 | Rahman et al. |
| 2023/0025233 A1 | 1/2023 | Engi |
| 2023/0164065 A1 | 5/2023 | Vasseur et al. |
| 2023/0261967 A1 | 8/2023 | Padi et al. |
| 2023/0379319 A1 | 11/2023 | Saini |
| 2024/0205130 A1* | 6/2024 | Babu .................... H04L 45/033 |
| 2024/0205137 A1* | 6/2024 | Babu ...................... H04L 45/24 |

* cited by examiner

Identify Route State
304

| Route Store (RS) | | |
|---|---|---|
| Route-Key | Route | Attribute Set |
| rk1 | r1' | attr-set-r1 |
| rk2 | r2' | attr-set-r2 |
| rk3 | r3' | attr-set-r3 |

| op | r in RS | Route State | New Route | Old Route |
|---|---|---|---|---|
| ADD | TRUE | UPDATE | r | r' |
| ADD | FALSE | ADD | r | NULL |
| DELETE | TRUE | DELETE | NULL | r' |
| DELETE | FALSE | | | |

FIG. 4

| Path-State | New-Path | Old-Path |
|---|---|---|
| ADD | p | NULL |
| UPDATE | p | p' |
| DELETE | NULL | p' |
| NO CHANGE | | |

Track Paths
308
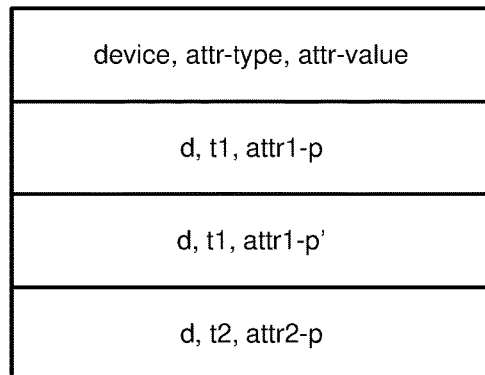
| Config-Store CS | | | |
|---|---|---|---|
| DEVICE | ATTRIBUTE | VALUE | EVENTS |
| d1 | Extended-Community | Route-target:1:1 | Route-Add, Route-Withdraw |
| d1 | Community | 100 :1 | Route-Purge |
| d2 | Prefix | 100.1.1.0/24 | Route-Update, Route-Withdraw |
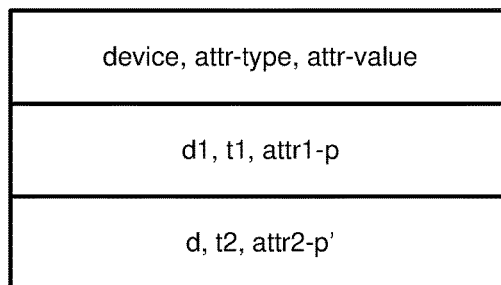
FIG. 6

Syncing of Prefix Tracker Application
310

Route State Sync

Update prefix tracker store with existing route data of interest from the route store if no entry already exists within the prefix tracker store.

Process Matched Paths

Process the tracked paths stored within the prefix tracker store, process the matched path configuration keys, and update the prefix tracker store accordingly.

Detect Route Purge

Detect a route purge when the last element in the prefix tracker set is deleted.

---

```
PT (path-config-key) = {
ADD = Set(Path-Key(p))
UPDATE = Set.AddElement(Path-Key(p))
DELETE = Set/RemoveElement(Path-Key(p))
}
PATH-KEY(p) = (path ID, origin)
```

In DELETE, if PT (path-config-key) reduces to zero, there are no rules with reachability with this attribute.

FIG. 7

METHOD AND APPARATUS FOR TELEMETRY MONITORING OF BGP PREFIXES IN A NETWORK TOPOLOGY

TECHNICAL FIELD

The disclosure relates to computing networks and particularly relates to telemetry monitoring of prefixes in a network topology.

BACKGROUND

Network computing is a means for multiple computers or nodes to work together and communicate with one another over a network. There exist wide area networks (WAN) and local area networks (LAN). Both wide and local area networks allow for interconnectivity between computers. Local area networks are commonly used for smaller, more localized networks that may be used in a home, business, school, and so forth. Wide area networks cover larger areas such as cities and can even allow computers in different nations to connect. Local area networks are typically faster and more secure than wide area networks, but wide area networks enable widespread connectivity. Local area networks are typically owned, controlled, and managed in-house by the organization where they are deployed, while wide area networks typically require two or more constituent local area networks to be connection over the public Internet or by way of a private connection established by a telecommunications provider.

Local and wide area networks enable computers to be connected to one another and transfer data and other information. For both local and wide area networks, there must be a means to determine a path by which data is passed from one compute instance to another compute instance. This is referred to as routing. Routing is the process of selecting a path for traffic in a network or between or across multiple networks. The routing process usually directs forwarding based on routing tables which maintain a record of the routes to various network destinations. Routing tables may be specified by an administrator, learned by observing network traffic, or built with the assistance of routing protocols.

Small networks may use manually configured routing tables to determine how information should travel from one computer to another computer. A routing table may include a listing of "best paths" indicating the most efficient or most desirable paths between a starting computer and a destination computer. Larger networks, including networks connected to the public Internet, may rely on complex topologies that can change rapidly such that the manual construction of routing tables is unfeasible. Dynamic routing attempts to solve this problem by constructing routing tables automatically based on information carried by routing protocols. Dynamic routing enables a network to act nearly autonomously in avoiding network failures and blockages. There exist multiple routing protocols that provide rules or instructions for determining best paths between networked devices. Examples of dynamic routing protocols and algorithms include Routing Information Protocol (RIP), Open Shortest Path First (OSPF), Enhanced Interior Gateway routing Protocol (EIGRP), and Border Gateway Protocol (BGP).

In some instances, path selection involves applying a routing metric to multiple routes to select or predict the best route. Most routing algorithms use only one network path at a time. Multiple path routing techniques enable the use of multiple alternative paths. In computer networks, a routing algorithm may be used to predict the best path between two compute instances. The routing algorithm may be based on multiple factors such as bandwidth, network delay, hop count, path cost, load, maximum transfer unit, reliability, and communication cost. The routing table stores a listing of the best paths. A topological database may store a list of the best paths and may further store additional information.

In some networks, routing is complicated by the fact that no single entity is responsible for selecting best paths. Instead, multiple entities are involved in selecting best paths or event portions of a single path. In the context of computer networking over the Internet, the Internet is partitioned into autonomous systems (AS) such as Internet Service Providers (ISPs). Each autonomous system controls routes involving its network. Autonomous system-level paths are selected based on the Border Gateway Protocol (BGP). Each autonomous system-level path includes a sequence of autonomous systems through which packets of information flow to travel from one compute instance to another compute instance. Each autonomous system may have multiple paths from which to choose that are offered by neighboring autonomous systems.

In many network routing implementations, it is desirable to detect routing events in the network, including when a route is added, withdrawn, or modified. In some cases, it is important to track certain routes within the network topology in real-time.

Considering the foregoing, disclosed herein are systems, methods, and devices for automatically tracking prefixes within a network topology based on telemetry data.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood regarding the following description and accompanying drawings where:

FIG. 4 is a schematic diagram of a process flow for identifying route states within a network topology;

FIG. 6 is a schematic diagram of a process flow for tracking paths within a network topology;

FIG. 7 is a schematic diagram of a process flow for tracking prefixes and syncing a prefix tracking datastore associated with a network topology;

DETAILED DESCRIPTION

Figure 1:
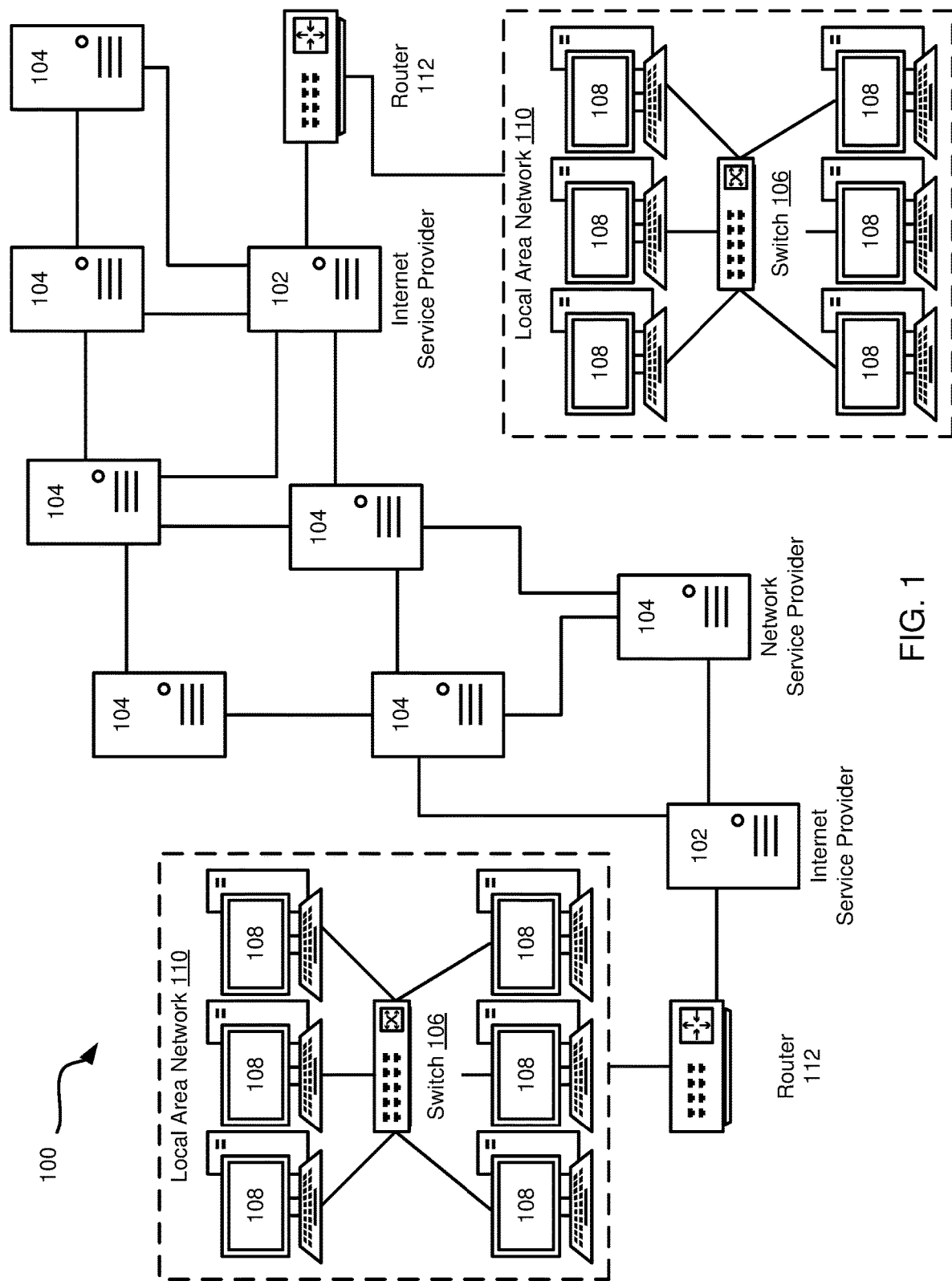
FIG. 1 is a schematic diagram of an example system of networked devices communicating over the Internet.

Disclosed herein are systems, methods, and devices for autonomously detecting routing events within a network topology. The systems, methods, and devices described herein may specifically be implemented in a network that routes traffic according to Border Gateway Protocol (BGP). As described herein, a speaker may be peered with a network visibility and analytics platform via the BGP to track routes across the network or send telemetry data directly to a network visibility and analytics platform. The BGP prefixes are tracked by matching route attributes such as communities, extended communities, large communities, prefixes, neighbor addresses, and so forth.

The BGP prefix tracker systems described herein are implemented to track specific events, including route/prefix events and network-wide events. The route/prefix events include, for example, newly added BGP routes, updates to existing BGP routes, and withdrawals or deletions of existing BGP routes. This includes detecting changes to the BGP Best Path by tracking BGP attributes such as an autonomous system path (AS path), multi-exit discriminator (MED), local preference (LocalPref), weight, origin, next hop, local preference, atomic aggregate, aggregator, community, originator identifier, cluster list, DPA, advertiser, multiprotocol reachable NLRI, multiprotocol unreachable NLRI, extended communities, and so forth. The network-wide events include, for example, detecting prefix reachability in the network, i.e., if a prefix is no longer reachable across all nodes within the network, route instability by tracking best path changes or route flaps, route de-prioritization and hijacking, path cost changes by tracking next hop information, and so forth. The BGP prefix tracker described herein provides an option to specify the network size to enable tracking at a pre-prefix level by specifying a list of neighbor router identifiers that are part of the tracking network. Additionally, the BGP prefix tracker described herein provides an option to filter nodes to be tracked within the network at a per-prefix level by specifying a list of neighbor router identifiers that are part of the nodes to be tracked within the network.

The prefix tracker is a real-time application that implements data streams. The data streams may specifically be implemented in a real-time streaming framework such as Kafka Streams, wherein the input and output data are stored in an Apache Kafka® cluster. The real-time data for all prefixes is provided to the prefix tracker from a BGP speaker by way of a local telemetry feed. The prefix tracker tracks the state across all BGP speakers within the network topology, including BGP peers and BGP prefixes and paths. The prefix tracker stores a state using a state store, which may include an in-memory hash map provided by the data stream. The state datastore may be implemented by stream processing applications to store and query data. The data stream offers fault tolerance and automatic recovery for local state stores. Each stream task within the prefix tracker application may embed multiple state stores to track network-wide states. The state stores may include, for example, a device store, configuration store, peer store, route store, and prefix tracker store. The relevant input source data receive across one or more data streams are stored across the different state stores using respective source processors.

The following is presented as further background for the disclosures presented herein. In a computer network environment, a networking device such as a switch or router may be used to transmit information from one destination to a destination. In an embodiment, a data package and a message may be generated at a first location such as computer within a person's home. The data package and the message could be generated from the person interacting with a web browser and requesting information from or providing information to a remote server accessible over the Internet. In an example, the data package and the message could be information the person input into a form accessible on a webpage connected to the Internet. The data package and the message may need to be transmitted to the remote server that may be geographically located far from the person's computer. It is likely that there is no direct communication between the router at the person's home and the remote server. Therefore, the data package and the message must travel by "hopping" to different networking devices until reaching the destination at the remote server. The router at the person's home must determine a route for transmitting the data package and the message thru multiple different devices connected to the Internet until the data package and the message reach the destination at the remote server.

The processes of determining a best bath from a first location to a destination and forwarding data packages and messages to a next destination are significant functions performed by a networking device such as a switch or router. The connections between networking devices in a network is referred to as the network topology. Network topology is the arrangement of elements such as links and nodes in a communication network. A network topology may include wired links, wireless links, or a combination of wired and wireless links between nodes in the network. Some examples of wired links include coaxial cables, telephone lines, power lines, ribbon cables, optical fibers, and so forth. Some examples of wireless links include satellites, cellular signals, radio signals, free-space optical communication, and so forth. The network topology includes an indication of all nodes in the network (e.g., computers, routers, switches, and other devices) and an indication of the linkages between nodes. Disclosed herein are systems, methods, and devices for improving network topology and network routing.

For purposes of furthering understanding of the disclosure, some explanation will be provided for numerous networking computing devices and protocols.

A BGP instance is a device for routing information in a network. A BGP instance may take the form of a route reflector appliance. The BGP instance may run on a switch, router, or BGP speakers on a switch. At a high level, the BGP instance sends all the paths it has learnt for a prefix to the best path controller. The best path controller responds with a set of best path from amongst those paths. The best path controller is permitted to modify the next-hop and attributes for any of the paths. Once the best paths are received, the BGP instance updates the local Routing Information Base (RIB) and advertises the best path out to its neighbors.

A switch (may alternatively be referred to as a switching hub, bridging hub, or MAC bridge) creates a network. Most internal networks use switches to connect computers, printers, phones, camera, lights, and servers in a building or campus. A switch serves as a controller that enables networked devices to talk to each other efficiently. Switches connect devices on a computer network by using packet switching to receive, process, and forward data to the destination device. A network switch is a multiport network bridge that uses hardware addresses to process and forward data at a data link layer (layer 2) of the Open Systems Interconnection (OSI) model. Some switches can also process data at the network layer (layer 3) by additionally incorporating routing functionality. Such switches are commonly known as layer-3 switches or multilayer switches.

A router connects networks. Switches and routers perform similar functions, but each has its own distinct function to perform on a network. A router is a networking device that forwards data packets between computer networks. Routers perform the traffic directing functions on the Internet. Data sent through the Internet, such as a web page, email, or other form of information, is sent in the form of a data packet. A packet is typically forwarded from one router to another router through the networks that constitute an internetwork (e.g., the Internet) until the packet reaches its destination node. Routers are connected to two or more data lines from different networks. When a data packet comes in on one of the lines, the router reads the network address information in the packet to determine the ultimate destination. Then, using information in the router's routing table or routing policy, the router directs the packet to the next network on its journey. A BGP speaker is a router enabled with the Border Gateway Protocol (BGP).

A customer edge router (CE router) is a router located on the customer premises that provides an interface between the customer's LAN and the provider's core network. CE routers, provider routers, and provider edge routers are components in a multiprotocol label switching architecture. Provider routers are in the core of the provider's or carrier's network. Provider edge routers sit at the edge of the network. Customer edge routers connect to provider edge routers and provider edge routers connect to other provider edge routers over provider routers.

A routing table or routing information base (RIB) is a data table stored in a router or a networked computer that lists the routes to particular network destinations. In some cases, a routing table includes metrics for the routes such as distance, weight, and so forth. The routing table includes information about the topology of the network immediately around the router on which it is stored. The construction of routing tables is the primary goal of routing protocols. Static routes are entries made in a routing table by non-automatic means and which are fixed rather than being the result of some network topology discovery procedure. A routing table may include at least three information fields, including a field for network ID, metric, and next hop. The network ID is the destination subnet. The metric is the routing metric of the path through which the packet is to be sent. The route will go in the direction of the gateway with the lowest metric. The next hop is the address of the next station to which the packet is to be sent on the way to its destination. The routing table may further include quality of service associate with the route, links to filtering criteria lists associated with the route, interface for an Ethernet card, and so forth.

For purposes of illustrating the concept of a routing table, the routing table may be analogized to using a map for delivering a package. A routing table is like the use of a map for delivering a package to its final destination. When a node needs to send data to another node on a network, the node must first know where to send the data. If the node cannot directly connect to the destination node, the node must send the data to other nodes along a proper route to the destination node. Most nodes do not try to figure out which routes might work. Instead, a node will send an IP packet to a gateway in the LAN, which then decides how to route the data to the correct destination. Each gateway will need to keep track of which way to deliver various packages of data, and for this it uses a routing table. A routing table is a database that keeps track of paths, like a map, and uses these paths to determine which way to forward traffic. Gateways can also share the contents of their routing table with other nodes requesting the information.

For hop-by-hop routing, each routing table lists, for all reachable destinations, the address of the next device along the path to that destination, i.e., the next hop. Assuming the routing tables are consistent, the algorithm of relaying packets to their destination's next hop thus suffices to deliver data anywhere in a network. Hop-by-hop is a characteristic of an IP Internetwork Layer and the Open Systems Interconnection (OSI) model.

The Open Systems Interconnection (OSI) model is a conceptual model that characterizes and standardizes the communication functions of a computing system without regard to its underlying internal structure and technology. The goal of the OSI model is the interoperability of diverse communication systems with standard communication protocols. The OSI model partitions a communication system into abstraction layers. A layer serves the layer above it and is served by the layer below. For example, a layer that provides error-free communications across a network provides the path needed by applications above it, while it calls the next lower layer to send and receive packets that constitute the contents of that path. Two instances at the same layer are visualized as connected by a horizontal connection in that layer. Communication protocols enable an entity in one host to interact with a corresponding entity at the same layer in another host. Service definitions, like the OSI model, abstractly describe the functionality provided to an (N)-layer by an (N−1)-layer, wherein N is one of the layers of protocols operating in the local host.

Route control is a type of network management that aims to improve Internet connectivity and reduce bandwidth cost and overall internetwork operations. Some route control services include a suite of hardware-based and software-based products and services that work together to improve overall Internet performance and finetune the use of available Internet bandwidth at minimal cost. Route control can be successful in scenarios where a network or autonomous system is sourcing Internet bandwidth from multiple providers. Route control can aid in the selection of the most optimal path for data transmission.

Some network communication systems are large, enterprise-level networks with thousands of processing nodes. The thousands of processing nodes share bandwidth from multiple Internet Service Providers (ISPs) and can process significant Internet traffic. Such systems can be extremely complex and must be properly configured to result in acceptable Internet performance. If the systems are not properly configured for optimal data transmission, the speed of Internet access can decrease, and the system can experience high bandwidth consumption and traffic. To counteract this problem, a set of services may be implemented to remove or reduce these concerns. This set of services may be referred to as routing control.

An embodiment of a routing control mechanism is composed of hardware and software. The routing control mechanism monitors all outgoing traffic through its connection with an Internet Service Provider (ISP). The routing control mechanism aids in selecting the best path for efficient transmission of data. The routing control mechanism may calculate the performance and efficiency of all ISPs and select only those ISPs that have performed optimally in applicable areas. Route control devices can be configured according to defined parameters pertaining to cost, performance, and bandwidth.

A known algorithm for determining the best path for the transmission of data is referred to as the Border Gateway Protocol (BGP). BGP is a path-vector protocol that provides routing information for autonomous systems on the Internet. When BGP is configured incorrectly, it can cause sever availability and security issues. Further, modified BGP route information can permit attackers to redirect large blocks of traffic so the traffic travels to certain routers before reaching its intended destination. The BGP best path algorithm can be implemented to determine the best path to install in an Internet Protocol (IP) routing table for traffic forwarding. BGP routers may be configured to receive multiple paths to the same destination.

The BGP best path algorithm assigns a first valid path as the current best path. The BGP best path algorithm compares the best path with the next path in the list until the BGP reaches the end of the list of valid paths. The list provides the rules that are used to determine the best path. For example, the list may include an indication that the path with the highest weight is preferred, the path without a local preference is preferred, the path that was locally originated by way of a network or aggregate BGP is preferred, a shortest path is preferred, a path with the lowest multi-exit discriminator is preferred, and so forth. The BGP best path selection process can be customized.

In the context of BGP routing, each routing domain is known as an autonomous system (AS). BGP assists in selecting a path through the Internet to connect two routing domains. BGP typically selects a route that traverses the least number of autonomous systems, referred to as the shortest AS path. In an embodiment, once BGP is enabled, a router will pull a list of Internet routes from BGP neighbors which may be ISPs. BGP will then scrutinize the list to find routes with the shortest AS paths. These routes may be entered in the router's routing table. Generally, a router will choose the shortest path to an AS. BGP uses path attributes to determine how to route traffic to specific networks.

Equal cost multipath (ECMP) routing is a routing strategy where next-hop packet forwarding to a single destination can occur over multiple "best paths." The multiple best paths are equivalent based on routing metric calculations. Multiple path routing can be used in conjunction with many routing protocols because routing is a per-hop decision limited to a single router. Multiple path routing can substantially increase bandwidth by load-balancing traffic over multiple paths. However, there are numerous issues known with ECMP routing when the strategy is deployed in practice. Disclosed herein are systems, methods, and devices for improved ECMP routing.

A Clos network can be deployed in telecommunications. A Clos network is a multistage circuit-switching network that represents an idealization of multistage switching systems. A Clos network includes three stages, including the ingress stage, the middle stage, and the egress stage. Each stage is made up of a number of crossbar switches. Each cell enters an ingress crossbar switch that can be routed through any of the available middle stage crossbar switches to the relevant egress crossbar switch. A middle stage crossbar is available for a particular new call if both the link connecting the ingress switch to the middle stage switch, and the link connecting the middle stage switch to the egress switch, are free.

A leaf-spine network topology can be deployed for connecting nodes in a computer network. The leaf-spine topology has two layers, including the leaf layer and the spine layer. The leaf layer consists of access switches that connect to devices like servers, firewalls, load balancers, and edge routers. The spine layer is made up of switches that perform routing and forms the backbone of the network where every leaf switch is interconnected with each spine switch. In a leaf-spine topology, all devices are located the same number of links away from each other and include a predictable and consistent amount of delay or latency for transmitting information.

A virtual local area network (VLAN) is a broadcast domain that is partitioned and isolated in a computer network at the data link layer. A VLAN may apply tags to network frames and handle those tags in networking systems to create the appearance and functionality of network traffic that is physically on a single network but acts as if it is split between separate networks. VLANs can keep network applications separate despite being connected to the same physical network, and without requiring multiple sets of cabling and networking devices to be deployed.

A switched virtual interface (SVI) is a virtual interface and port that transmits untagged-VLAN packets for a managed switch. Traditionally, switches send traffic only to hosts within the same broadcast domain (single VLAN) and routers handle traffic between different broadcast domains (different VLANs). In such an implementation, network devices in different broadcast domains cannot communicate without a router. When an SVI is implemented, a switch may use a virtual Layer3 interface to route traffic to other Layer3 interfaces. This eliminates the need for a physical router. VLANs reduce the load on a network by dividing a LAN into smaller segments and keeping local traffic within a VLAN. However, because each VLAN has its own domain, there is a need for a mechanism for VLANs to pass data to other VLANs without passing the data through a router. The SVI is such a mechanism. An SVI is normally found on switches (for example, Layer3 and Layer2 switches). When an SVI is implemented, a switch can recognize packet destinations that are local to the sending VLAN and can switch those packets destined for different VLANs. In an embodiment, there is one-to-one mapping between a VLAN and an SVI. In such an embodiment, only a single SVI can be mapped to a VLAN.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems, and methods for tracking the life cycle of objects in a network computing environment are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Referring now to the figures, FIG. 1 illustrates a schematic diagram of a system 100 for connecting devices to the Internet. The system 100 includes multiple local area network 160 connected by a switch 106. Each of the multiple local area networks 160 can be connected to each other over the public Internet by way of a router 162. In the example system 100 illustrated in FIG. 1, there are two local area networks 160. However, it should be noted that there may be many local area networks 160 connected to one another over the public Internet. Each local area network 160 includes multiple computing devices 108 connected to each other by way of a switch 106. The multiple computing devices 108 may include, for example, desktop computers, laptops, printers, servers, and so forth. The local area network 160 can communicate with other networks over the public Internet by way of a router 162. The router 162 connects multiple networks to each other. The router 162 is connected to an internet service provider 102. The internet service provider 102 is connected to one or more network service providers 104. The network service providers 104 are in communication with other local network service providers 104 as shown in FIG. 1.

The switch 106 connects devices in the local area network 160 by using packet switching to receive, process, and forward data to a destination device. The switch 106 can be configured to, for example, receive data from a computer that is destined for a printer. The switch 106 can receive the data, process the data, and send the data to the printer. The switch 106 may be a layer-1 switch, a layer-2 switch, a layer-3 switch, a layer-4 switch, a layer-7 switch, and so forth. A layer-1 network device transfers data but does not manage any of the traffic coming through it. An example of a layer-1 network device is an Ethernet hub. A layer-2 network device is a multiport device that uses hardware addresses to process and forward data at the data link layer (layer 2). A layer-3 switch can perform some or all the functions normally performed by a router. However, some network switches are limited to supporting a single type of physical network, typically Ethernet, whereas a router may support various kinds of physical networks on different ports.

The router 162 is a networking device that forwards data packets between computer networks. In the example system 100 shown in FIG. 1, the routers 162 are forwarding data packets between local area networks 160. However, the router 162 is not necessarily applied to forwarding data packets between local area networks 160 and may be used for forwarding data packets between wide area networks and so forth. The router 162 performs traffic direction functions on the Internet. The router 162 may have interfaces for diverse types of physical layer connections, such as copper cables, fiber optic, or wireless transmission. The router 162 can support different network layer transmission standards. Each network interface is used to enable data packets to be forwarded from one transmission system to another. Routers 162 may also be used to connect two or more logical groups of computer devices known as subnets, each with a different network prefix. The router 162 can provide connectivity within an enterprise, between enterprises and the Internet, or between internet service providers' networks as shown in FIG. 1. Some routers 162 are configured to interconnecting various internet service providers or may be used in large enterprise networks. Smaller routers 162 typically provide connectivity for home and office networks to the Internet. The router 162 shown in FIG. 1 may represent any suitable router for network transmissions such as an edge router, subscriber edge router, inter-provider border router, core router, internet backbone, port forwarding, voice/data/fax/video processing routers, and so forth.

The internet service provider (ISP) 102 is an organization that provides services for accessing, using, or participating in the Internet. The ISP 102 may be organized in various forms, such as commercial, community-owned, non-profit, or privately owned. Internet services typically provided by ISPs 102 include Internet access, Internet transit, domain name registration, web hosting, Usenet service, and colocation. The ISPs 102 shown in FIG. 1 may represent any suitable ISPs such as hosting ISPs, transit ISPs, virtual ISPs, free ISPs, wireless ISPs, and so forth.

The network service provider (NSP) 104 is an organization that provides bandwidth or network access by providing direct Internet backbone access to Internet service providers. Network service providers may provide access to network access points (NAPs). Network service providers 104 are sometimes referred to as backbone providers or Internet providers. Network service providers 104 may include telecommunication companies, data carriers, wireless communication providers, Internet service providers, and cable television operators offering high-speed Internet access. Network service providers 104 can also include information technology companies.

It should be noted that the system 100 illustrated in FIG. 1 is exemplary only and that many different configurations and systems may be created for transmitting data between networks and computing devices. Because there is a great deal of customizability in network formation, there is a desire to create greater customizability in determining the best path for transmitting data between computers or between networks. Considering the foregoing, disclosed herein are systems, methods, and devices for offloading best path computations to an external device to enable greater customizability in determining a best path algorithm that is well suited to a certain grouping of computers or a certain enterprise.

Figure 2:
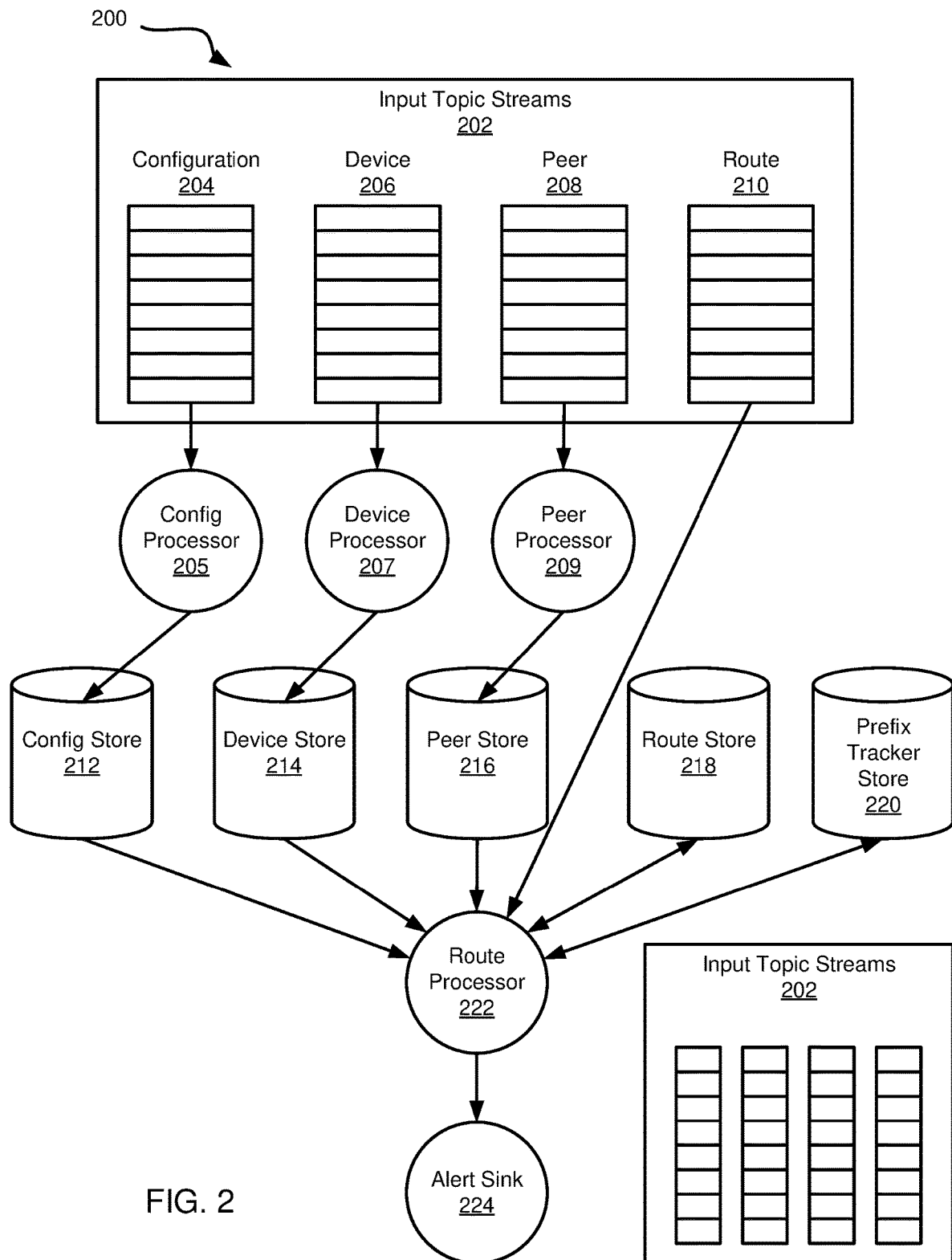
FIG. 2 is a schematic diagram of a system for automatically tracking prefixes within a network topology based on telemetry data.

FIG. 2 is a schematic diagram of a topology 200 for implementing a prefix tracker application as described herein. The prefix tracker application may specifically be implemented to track events within a network implementing the Border Gateway Protocol (BGP).

The topology 200 includes a plurality of input topic streams 202. The input topic streams 202 include, for example, configuration stream 204, device stream 206, peer stream 208, and a route stream 210. The peer stream 208 may specifically receive data relating to BGP peers. The route stream 210 may specifically receive data relating to BGP routes. It should be noted that the input topic streams 202 may include other data streams as needed. The input topic streams 202 are managed by and fed into independent processing resources. For example, the configuration stream 204 feeds into the configuration processor 205. Likewise, the device stream 206 feeds into the device processor 207, and the peer stream 208 feeds into the peer processor 209. The route stream 210 may feed directly into the route processors 220.

In an implementation, the input topic streams 202 are input topic streams within a real-time streaming framework such as Kafka®. The real-time streaming framework is a client library for building applications and microservices, wherein the input and output data are stored in a cluster. The Kafka Stream combines the simplicity of writing and deploying standard Java and Scala applications on the client side with the benefits of a server-side cluster technology. The real-time streaming frameworks are implemented for stateful processing features, fault tolerance, and processing guarantees built on top of functionality provided by storage and messaging layers.

The topology 200 includes a plurality of independent state stores, including, for example, a configuration store 212, device store 214, peer store 216, route store 218, and prefix tracker store 220. The states stores 212-220 may be implemented as a persistent hash map present within a stream within a real-time streaming framework. The topology 200 includes different state stores 212-220 for different information. The state stores 212-220 are implemented with fault tolerance and automatic recovery.

The data received by way of the configuration stream 204 is processed by the configuration processor 205 and then stored in the configuration store 212. Similarly, the data received by the device stream 206 is processed by the device processor 207 and then stored in the device store 214, and the data received by the peer stream 208 is processed by the peer processor 209 and then stored in the peer store 216. The data received by the route stream 210 is processed by the route processor 222 and then stored in the route store 218. The route processor 222 is in communication with each of the configuration store 212, the device store 214, the peer store 216, and the route store 218. The route processor 222 is further in communication with a prefix tracker store 220, wherein data for the prefix tracker application is stored. The route processor 222 is in communication with an alert sink 224 that serves as a notification queue that stores alert messages. The events detected by the prefix tracker are sent to the alert sink 224 where they are stored until consumed by a northbound application to be sent as notification or for further data processing.

The prefix tracker application executes a plurality of different tasks. Each of these tasks may be referred to as a "stream task" herein. Each stream task is associated with one or more of the stream stores 212-220. Each prefix and/or device within the network topology may be assigned to a particular set of stream tasks which may include one of each type of stream store mentioned in 212-220. The telemetry data for network resources such as devices, routes, peers, configuration, and so forth may be split based on device or another partitioning scheme into these multiple stream tasks of each kind mentioned in 212-220. The prefix tracker may be modified to add additional stream tasks for new routes, devices, or other network resources as the network topology grows.

The device stores 212-220 are implemented as hash maps. The configuration store 212 stores configuration information about different prefix attributes that are used by the prefix tracker to match prefixes with those attributes and then track the prefixes. A path is of interest to the prefix tracker if that path matches any attribute entry in the configuration store. The device store 214 stores the list of devices in the network which also includes the devices sending their prefixes to the prefix tracker. The peer store 216 tracks the peering data between BGP speakers within the network. The data within the peer store 216 is used to determine which peer is sending routes. This data may be particularly important when determining which devices will be affected when a prefix within the network topology is added, updated, or withdrawn. The route store 218 stores all routes for the network topology, including routes that are not currently being tracked but may be tracked in the future. The prefix tracker store 220 tracks the routes of interest (i.e., the routes that are currently being tracked with the prefix tracker application).)

The processors 205, 207, 209, 220 are responsible for retrieving data from the respective input topic stream 202, translating the data to the correct format, and then storing the data in the correct state store 212-218. When the state stores 212-220 have been updated, the route processor 222 will update the data within each of the state stores 212-220 and update the alert sink 224. The state stores 212-220 are updated automatically via telemetry data received from the network devices as and when the network topology is updated or modified. The route processor 222 processes the telemetry route and prefix updates that are received from the network devices. The route processor uses the information from the other state stores and updates the prefix tracker store and the alert sink.

The prefix tracker application can be configured to track different route attributes. Specifically, the prefix tracker may be implemented to track community attributes, extended community attributes, large community attributes, prefix attributes, neighbor address attributes, and so forth. The prefix tracker may be configured to track different events, including, route-specific events and network events. The route-specific events include, for example, an indication that one or more routes within the network topology has been added, an indication that one or more routes within the network topology has been updated, or an indication that one or more routes within the network topology has been withdrawn or deleted.

The network events may include events that monitor network reachability for prefixes, route stability by tracking best path changes and route flaps, route de-prioritization or hijacking, and next hop tracking. When a route's best path changes, the best path marker would now identify the new path. This information can be tracked after receiving a new update for the route via telemetry. When tracking changes to the best path of a route, other network-wide events may also be tracked such as the stability of the route, whether a route was deprioritized or hijacked, and the next hop of the route.

The system may track route stability by counting the number of best path changes made to the route over time. If the route has changed more than a threshold quantity of times in a given period, then the route stability for that time period will be lower. The prefix tracker may track the number of flaps or best path changes as a function of time to determine whether a route is stable. If the prefix tracker determines the route is unstable, then the prefix tracker may trigger an alert notification indicating the route is unstable. This information may be tracked across the network to indicate the areas where the route is not stable and provides spotty reachability.

The prefix tracker may track route de-prioritization or hijacking. The best path for a route may change due to a new path becoming preferred to the older path. This may occur when attributes of the current best path are updated with a lower preference or priority value, or if the attributes of the new best path have a higher preference or priority value. The prefix tracker detects and records which attributes of the route have changed and provides an idea of why a route was de-prioritized. The prefix tracker additionally determines if a route was de-prioritized maliciously through hijacking.

The prefix tracker performs next hop tracking that provides information about the next hop IP address that will be used to forward traffic to a certain destination. The next hop provides information about the link the router needs to use to forward traffic. Sometimes it is preferred to use next hop links with a lower cost. In some cases, certain next hop IP addresses may be blacklisted via configuration, and if routes use that next hop, then the prefix tracker may trigger an alert. Similarly, the prefix tracker may track the local-pref, and/or the IGP metric for the next hop to check why a route was de-prioritized.

The prefix tracker application may receive configuration instructions by way of the configuration stream 204. These configuration settings may then be stored in the configuration store 212 and processed with the configuration processor 205. The configuration store 212 may store the configuration settings in a key-value format. In this implementation, the key is a tuple of attribute type, and the value is an attribute value for easy lookup when processing routes. The route processor 222 uses the configuration store 212 to check whether a prefix needs to be tracked. The prefix tracker may be configured and reconfigured at any time after initialization. These configuration settings may also contain multiple attribute value pairs to filter and track prefixes, which would translate to multiple key-value pairs in the configuration store.

The route processor 222 receives routes that are streamed from a telemetry data feed. This feed continually updates data whenever a network path is updated. The route processor 222 identifies a path change. The path change includes one or more of a newly added path, an updated path, or a withdrawn path. The route processor 222 is capable of identifying the path change because all prefixes for the network topology are stored in the route store 218. The route processor 222 determines whether the path change is of interest to the prefix tracker based on whether the path includes any attributes matching data within the configuration store 212. If the path change is of interest to the prefix tracker, then the altered prefix associated with the path change will be stored in the prefix tracker store 220. If the path change triggered an event, then the prefix tracker will generate an alert for the event.

The prefix tracker application processes telemetry updates inline. In some implementations, there is no post processing of routes after configuration. Rather, any route updates are processed inline, and the context/state is stored when the route updates arrive. Post processing creates a window wherein data may get out of sync in a real-time system. This step reduces complexities with data synchronization and tracking prefixes that may already exist within any BGP speaker. This ensures the prefix tracker may function as a complete real-time application.

The prefix tracker's processor topology 200 may be scaled by breaking the processor topology into multiple stream tasks. The input data streams can be split into separate partitions based on attributes such as a device identifier, creating a fixed number of stream tasks based on the input stream partitions. Each of these stream tasks is assigned a list of partitions from the input stream. The assignment of partitions to these tasks does not change, thus making the stream task a fixed unit of parallelism for the prefix tracker. These tasks instantiate their own processor topology for the assigned partitions, and process data independently and in parallel.

Figure 3A:
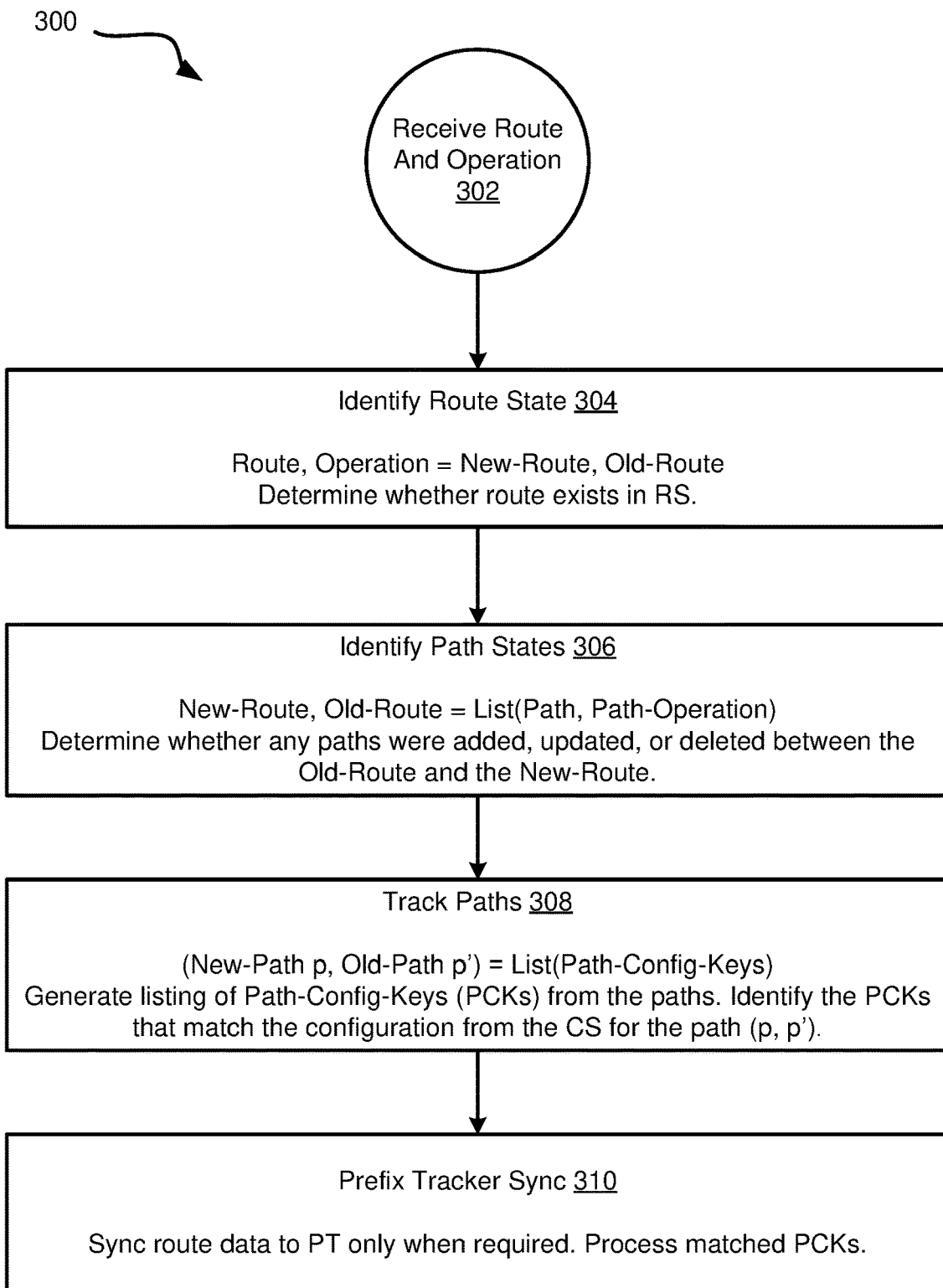
FIG. 3A is a schematic diagram of a process flow for automatically tracking prefixes within a network topology based on telemetry data.

FIG. 3A is a schematic diagram of a process flow 300 for the prefix tracker application described herein. The process flow 300 is implemented at least when a route and operation are received at 302. The prefix tracker application is configured to identify a route state at 304, identify a path state at 306, track paths at 308, and sync at 310.

Figure 3B:
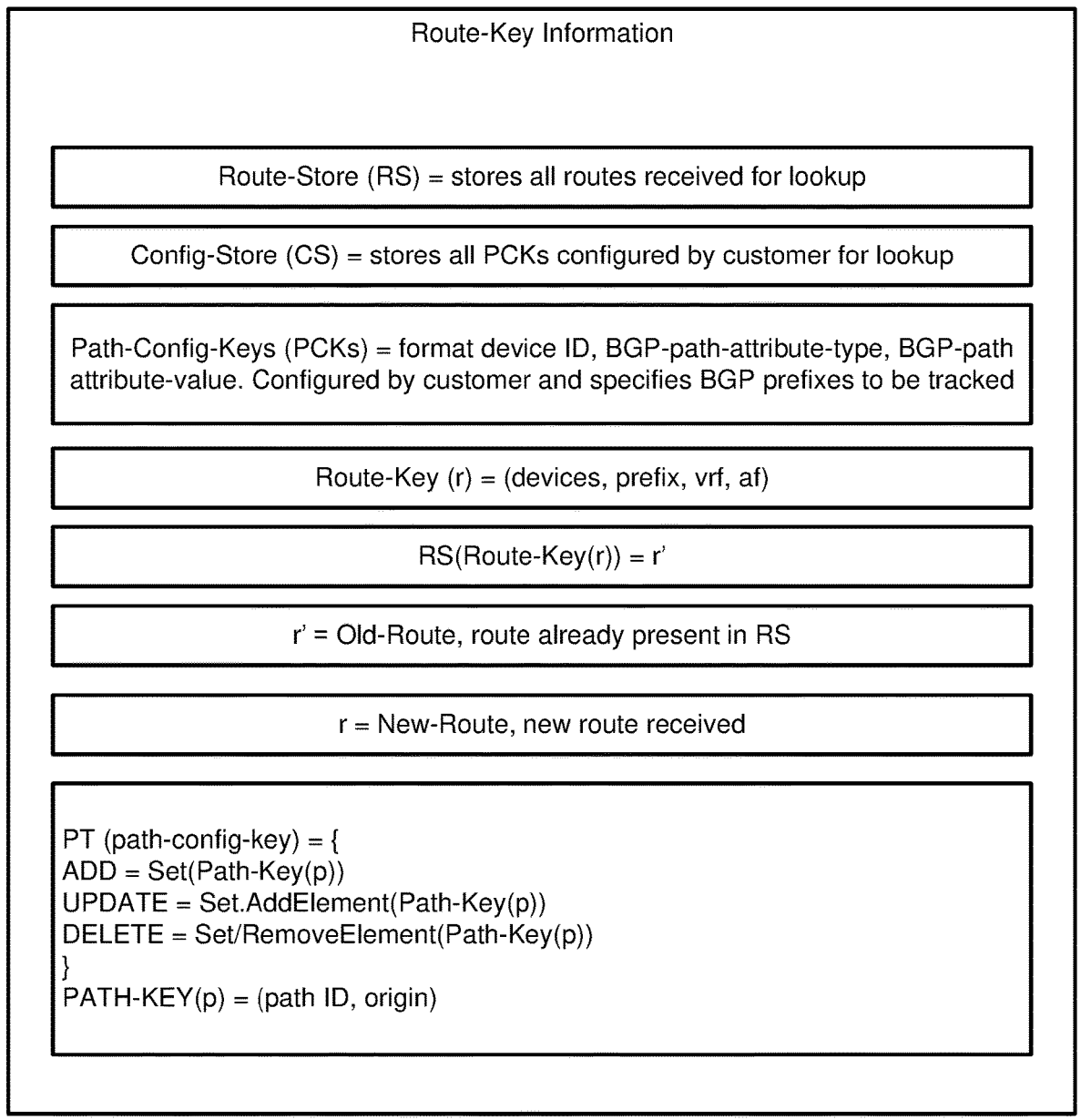
FIG. 3B is a key comprising route-key information applicable to the steps illustrated in FIGS. 4-7.

FIG. 3B includes a key identifying route-key information applicable to the process flow 300. As described herein, the route store (RS) stores all route received for lookup. The configuration store (CS) stores all path-config-keys (PCKs) configured by a customer for lookup. The path-config-keys (PCKs) format the device identifier, BGP-path-attribute-type, and BGP-path-attribute-value. The PCKs may be configured by a customer to specify BGP prefixes to be tracked. The route key (r) includes (devices, prefix, vrf, af). The RS (route-key(r)) is equal to r' as described herein. The r' as described herein includes the Old-Route, which is the route already present in the route-store. The r as described herein includes the New-Route, which is the new route received.

The prefix tracker application identifies route states at 304. This process is further illustrated in FIG. 4, based on the accompanying route-key information table included in FIG. 3B. This identification process includes determining whether an old (existing) route exists, and whether the old route corresponds with the new route that was received at 302.

If the operation indicates that the route should be ADDED, then the prefix tracker determines whether the new route exists within the route store 218. If the new route exists within the route store (r in RS=TRUE), then the route state will be UPDATED. The route store 218 is updated to reflect the new route (r) and the old route (r'). If the new route does not exist within the route store (r in RS=FALSE), then the new route will be ADDED.

If the operation indicates that the route should be DELETED, then the prefix tracker determines whether the new route exists within the route store 218. If the new route exists within the route store (r in RS=TRUE), then the route state will be DELETED. The route store 218 will be updated to reflect the new route is NULL after the route is processed by the prefix tracker. If the new route does not exist within the route store (r in RS=FALSE), the route store 218 will not be updated.

Figure 5:
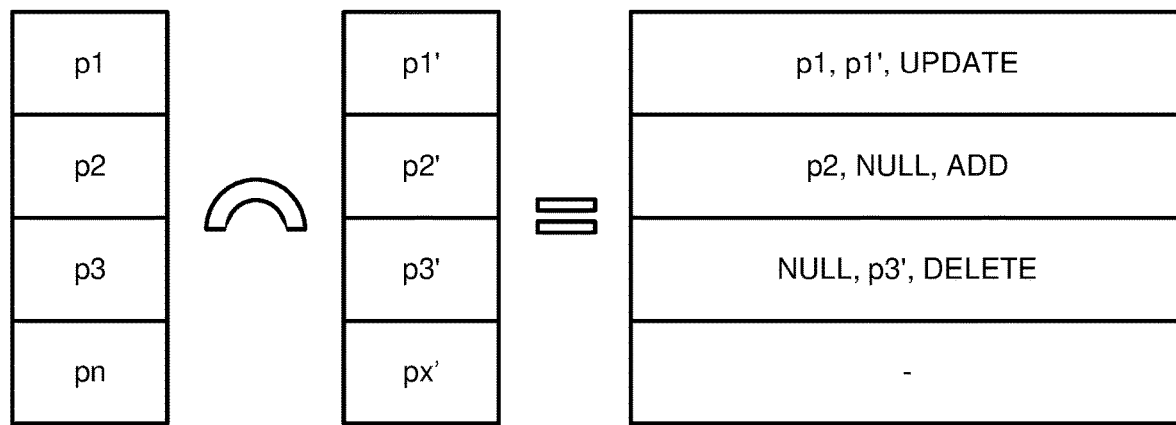
FIG. 5 is a schematic diagram of a process flow for identifying path states within a network topology.

The prefix tracker application identifies path states at 306. This process is further illustrated in FIG. 5. The prefix tracker determines which paths were added, which paths were withdrawn, and which paths were updated.

The prefix tracker compares the old paths and the new paths. In the example illustrated in FIG. 5, the prefix tracker compares the new path p1 against the old path p1'. If the new path p1 was modified from the old path p1', the prefix tracker determines that the path is UPDATED. If the old path p1' and the new path p1 are the same, the prefix tracker determines that the path is UNCHANGED. Further for example, if the prefix tracker does not find any equivalent old path for a new path p2, then prefix tracker determines that the new path p2 was ADDED. Further for example, if the prefix tracker does not find any equivalent new path for an old path p3', then the prefix tracker determines that the old path p3' was DELETED.

The prefix tracker application tracks paths at 308. This process is further illustrated in FIG. 6. The prefix tracker matches each path with its associated attributes that are stored in the configuration store 212. The configurations may be received directly from a customer seeking to manage the network topology. The prefix tracker generates a list of path configuration keys (PCKs) based on the new paths and respective old paths if any, or any other old paths that do not have a corresponding new path. The PCKs are overlapped with the configuration store 212 to determine if there are any matches. If the prefix tracker identifies a match, then the prefix tracker will indicate that the path needs to be tracked.

A PCK is a tuple with format Device ID, bgp-path-attribute-type, bgp-path attribute value.

In the example illustrated in FIG. 6, a list of entries configured on the Config-Store is shown. Each entry indicates provides the device and BGP path attribute type and value, any path that matches this is a path that is of interest to a customer and that would be tracked by the prefix tracker. As an example, the first entry in CS implies all paths in device d1 that have an extended community of value "route-target: 1:1" must be tracked. This list of configured PCKs is overlapped with the list of PCKs generated from the old path and new path as explained in 0081, if there are any entries that match, the path is tracked by the prefix tracker. The second entry implies that all paths in device d1 that have a community attribute of 100:1 must be tracked. The third entry implies that all prefixes in device d2 with prefix 100.1.1.0/24 must be tracked.

The prefix tracker application syncs at 310. This process is further illustrated in FIG. 7. If the prefix tracker application identifies a path of interest when tracking paths at 308, then the prefix tracker application will proceed to syncing at 310. If multiple attribute value pairs were configured to track the prefixes, then the prefix tracker ensures all the attributes in the configuration match while identifying if a path is of interest in this step.

The syncing 310 process include updating the prefix tracker store 220 with existing route data of interest from the route store 218 if no entry already exists within the prefix tracker store 220. The syncing 310 process includes processing matched paths by processing the tracked paths stored within the prefix tracker store 220, processing the matched path configuration keys, and updating the prefix tracker store 220 accordingly. (Firstly, as part of the prefix tracker sync process 310, the prefix tracker store syncs the route data of interest from the route store if this data does not exist in prefix tracker store already. This operation is done to maintain/sync route context even if this prefix was previously untracked or configuration was added recently to track this prefix. This allows updates to be processed inline. Then, the tracked paths and the matched PCKs from the last step are used in conjunction with the data in the prefix tracker store to detect events.

The config store also indicates the subscribed events for a configured PCK entry which can include route events or network events as described below. Notifications for the tracked paths are sent to the alert sink for notification or for further processing if the matched PCKs in the Config Store have subscribe to any route events.

If the matched PCKs in Config Store have subscribe to any network events, such as route purge, etc. Depending on the network events, further processing is done to detect if such an event happened or not. For example, in a network wide event like a route purge, if a path was withdrawn, the total number of paths in the prefix tracker store is checked for that route and PCK. If this number becomes 0 with that last path withdrawal, this implies that the prefix is no longer reachable across the network and so a notification for a route purge is sent to the alert sink. If this number is not 0 with that last path withdrawal, no notification is generated.

Figure 8:
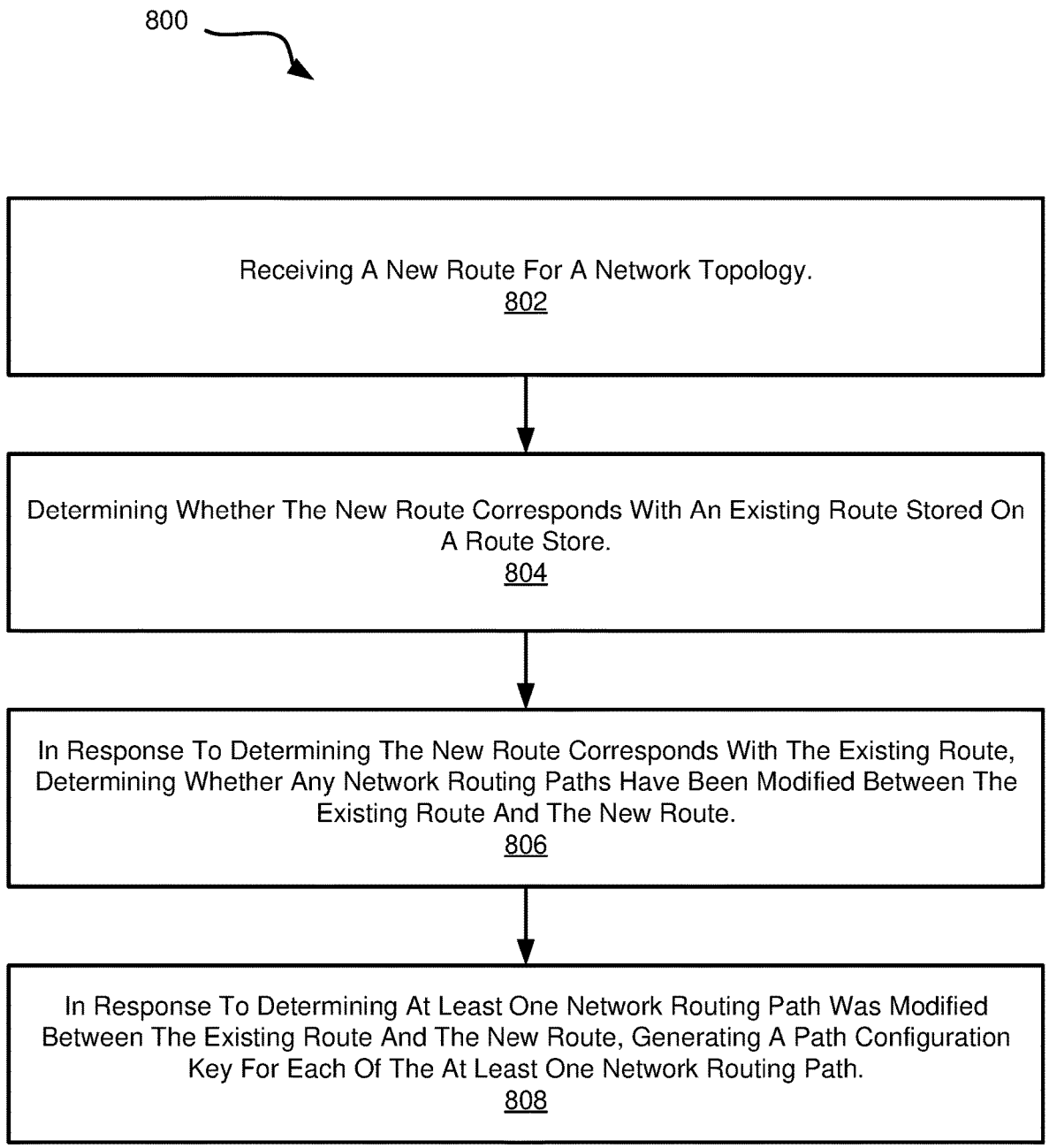
FIG. 8 is a schematic flow chart diagram of a method for automatically tracking prefixes within a network topology based on telemetry data.

FIG. 8 is a schematic flow chart diagram of a method 800 for tracking prefixes within a network topology based on telemetry data. The method 800 includes receiving at 802 a new route for a network topology. The method 800 includes determining at 804 whether the new route corresponds with an existing route stored on a route store. The method 800 includes, in response to determining the new route corresponds with the existing route, determining at 806 whether any network routing paths have been modified between the existing route and the new route. The method 800 includes, in response to determining at least one network routing path was modified between the existing route and the new route, generating at 808 a path configuration key for each of the at least one network routing path.

Figure 9:
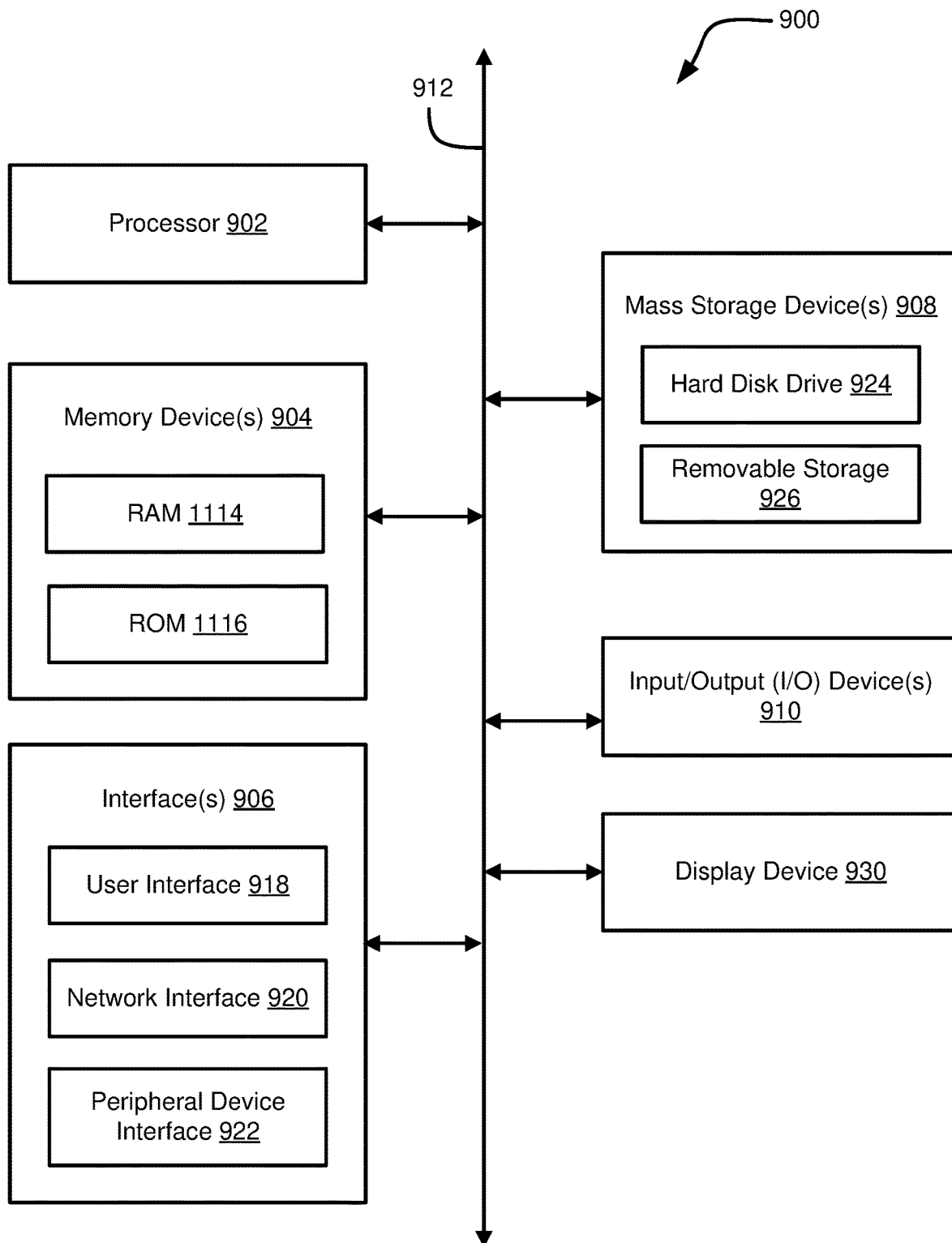
FIG. 9 is a schematic diagram illustrating components of an example computing device.

Referring now to FIG. 9, a block diagram of an example computing device 900 is illustrated. Computing device 900 may be used to perform various procedures, such as those discussed herein. In one embodiment, the computing device 900 can function to perform the functions of the asynchronous object manager and can execute one or more application programs. Computing device 900 can be any of a wide variety of computing devices, such as a desktop computer, in-dash computer, vehicle control system, a notebook computer, a server computer, a handheld computer, tablet computer and the like.

Computing device 900 includes one or more processor(s) 902, one or more memory device(s) 904, one or more interface(s) 906, one or more mass storage device(s) 908, one or more Input/output (I/O) device(s) 902, and a display device 930 all of which are coupled to a bus 912. Processor(s) 902 include one or more processors or controllers that execute instructions stored in memory device(s) 904 and/or mass storage device(s) 908. Processor(s) 902 may also include several types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device is a hard disk drive 924. Various drives may also be included in mass storage device(s) 908 to enable reading from and/or writing to the various computer readable media. Mass storage device(s) 908 include removable media 926 and/or non-removable media.

Input/output (I/O) device(s) 902 include various devices that allow data and/or other information to be input to or retrieved from computing device 900. Example I/O device(s) 902 include cursor control devices, keyboards, keypads, microphones, monitors or other display devices, speakers, printers, network interface cards, modems, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 may include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more user interface elements 918. The interface(s) 906 may also include one or more peripheral interfaces such as interfaces for printers, pointing devices (mice, track pad, or any suitable user interface now known to those of ordinary skill in the field, or later discovered), keyboards, and the like.

Bus 912 allows processor(s) 902, memory device(s) 904, interface(s) 906, mass storage device(s) 908, and I/O device(s) 902 to communicate with one another, as well as other devices or components coupled to bus 912. Bus 912 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 900 and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Examples

The following examples pertain to further embodiments.

Example 1 is a method. The method includes receiving a route for a network topology and determining whether the route corresponds with an existing route stored on a route store. The method includes, in response to determining the route corresponds with the existing route, determining whether any network routing paths have been modified between the existing route and the route. The method includes, in response to determining at least one network routing path was modified between the existing route and the route, generating a path configuration key for each of the at least one network routing path.

Example 2 is a method as in Example 1, wherein receiving the route for the network topology comprises receiving an update directly from an input topic stream that is dedicated to receiving updated route information for the network topology.

Example 3 is a method as in any of Examples 1-2, wherein determining whether the route corresponds with the existing route stored on the route store comprises determining based on data associated with the route, and wherein the data comprises one or more of a prefix, a virtual routing and forwarding (VRF) address, or a device.

Example 4 is a method as in any of Examples 1-3, further comprising receiving an ADD or DELETE operation associated with the route, and wherein the method further comprises updating the route store in accordance with the ADD or the DELETE operation.

Example 5 is a method as in any of Examples 1-4, further comprising, in response to the route being associated with the ADD operation; and further in response to identifying the existing route on the route store, updating the route store to UPDATE the existing route to reflect the route; or further in response to determining there is no existing route stored on the route store that corresponds with the route, updating the route store to ADD the route.

Example 6 is a method as in any of Examples 1-5, further comprising, in response to the route being associated with the DELETE operation; and further in response to identifying the existing route on the route store, updating the route to DELETE the existing route; or further in response to determining there is no existing route stored on the route store that corresponds with the route, ending processing operations associated with the route.

Example 7 is a method as in any of Examples 1-6, wherein determining whether any network routing paths have been modified between the existing route and the route comprises: determining whether any routing path that is not present within the existing route has been added to the route; determining whether any routing path present in the existing route has been modified within the route; and determining whether any routing path present in the existing route has been withdrawn in the route.

Example 8 is a method as in any of Examples 1-7, wherein the path configuration key comprises one or more of a device identifier, a Border Gateway Protocol (BGP) path attribute type, or a BGP path attribute value.

Example 9 is a method as in any of Examples 1-8, wherein the path configuration key comprises an indication of one or more BGP prefixes to be tracked.

Example 10 is a method as in any of Examples 1-9, wherein generating the path configuration key comprises generating a plurality of path configuration keys, and wherein each of the plurality of path configuration keys is associated with one network routing path that has been modified between the existing route and the route.

Example 11 is a method as in any of Examples 1-10, further comprising identifying at least one path configuration key of the plurality of path configuration keys that matches configuration data for the new path, wherein the configuration data is stored in a configuration store.

Example 12 is a method as in any of Examples 1-11, wherein the configuration store comprises attributes associated with the new path, and wherein the attributes comprise one or more of an extended community attribute, a community attribute, or a prefix attribute.

Example 13 is a method as in any of Examples 1-12, further comprising determining whether the route should be tracked based on user input.

Example 14 is a method as in any of Examples 1-13, further comprising: in response to determining the route should be tracked, determining whether the route is already stored on a prefix tracker store; and in response to determining the route is not already stored on the prefix tracker store, writing to the prefix tracker store to include the route.

Example 15 is a method as in any of Examples 1-14, further comprising: processing the path configuration key for each of the at least one network routing path; and writing to the prefix tracker store to include the path configuration key for each of the at least one network routing path.

Example 16 is a method as in any of Examples 1-15, further comprising detecting a route purge in response to determining that at least one element of the route has been deleted from the prefix tracker store.

Example 17 is a method as in any of Examples 1-16, wherein receiving the route for the network topology comprises receiving an update via a stream within a real-time streaming framework.

Example 18 is a method as in any of Examples 1-17, wherein the route store is a stream store in communication with a route processor, and wherein the route processor is in communication with a plurality of input topic streams that receive data in real-time.

Example 19 is a method as in any of Examples 1-18, wherein receiving the route for the network topology further comprises receiving an operation associated with the route, and wherein the operation comprises one of ADD or DELETE.

Example 20 is a method as in any of Examples 1-19, wherein the method is performed by a prefix tracker application operated on one or more servers associated with a network platform configured to manage a network topology.

Example 21 is a system. The system includes a plurality of input topic streams. The system includes a plurality of processors, wherein each of the plurality of processors is dedicated to one of the plurality of input topic streams. The system includes a plurality of stream stores for storing data, wherein each of the plurality of stream stores is dedicated to one of the plurality of input topic streams. The system includes a route processor in communication with each of the plurality of stream stores. The system is such that the route processor determines whether a route for a network topology corresponds with an existing route stored on at least one of the plurality of stream stores.

Example 22 is a system as in Example 21, wherein the plurality of stream stores comprises a configuration store, and wherein the configuration store is processed by a dedicated configuration processor, and wherein the dedicated configuration processor is in communication with a configuration stream of the plurality of input topic streams.

Example 23 is a system as in any of Examples 21-22, wherein the configuration store comprises attribute information for a plurality of routes of a network topology, and wherein the attribute information comprises one or more of community attributes, extended community attributes, or large community attributes.

Example 24 is a system as in any of Examples 21-23, wherein the plurality of stream stores comprises a device store, and wherein the device store is processed by a dedicated device processor, and wherein the dedicated device processor is in communication with a device stream of the plurality of input topic streams.

Example 25 is a system as in any of Examples 21-24, wherein the device store comprises an indication of which devices within a network topology are tracking prefixes for the network topology.

Example 26 is a system as in any of Examples 21-25, wherein the plurality of stream stores comprises a route store, and wherein the route store is processed by the route processor, and wherein the route store comprises information for a plurality of routes of a network topology.

Example 27 is a system as in any of Examples 21-26, wherein one or more of the plurality of input topic streams is a stream with a real-time streaming framework.

Example 28 is a system as in any of Examples 21-27, wherein one or more of the plurality of input topic streams is a stream within a real-time streaming framework.

Example 29 is a system as in any of Examples 21-28, wherein each of the plurality of input topic streams receives data pertaining to a network topology in real-time.

Example 30 is a system as in any of Examples 21-29, wherein the route processor is configured to execute instructions for tracking prefixes within a network topology based on telemetry data.

Example 31 is a system as in any of Examples 21-30, wherein the instructions comprise: receiving a route for the network topology by way of a route stream of the plurality of input topic streams; and determining whether the route corresponds with an existing route stored on a route store of the plurality of stream stores.

Example 32 is a system as in any of Examples 21-31, wherein the instructions further comprise: in response to determining the route corresponds with the existing route, determining whether any network routing paths have been modified between the existing route and the route; and in response to determining at least one network routing path was modified between the existing route and the route, generating a path configuration key for each of the at least one network routing path.

Example 33 is a system as in any of Examples 21-32, further comprising storing the path configuration key for each of the at least one network routing path on a prefix tracker store, wherein the prefix tracker store is not dedicated to an input topic stream and is independent of the plurality of input topic streams.

Example 34 is a system as in any of Examples 21-33, wherein the instructions are such that determining whether the route corresponds with the existing route stored on the route store comprises determining based on data associated with the route, and wherein the data comprises one or more of a prefix, a virtual routing and forwarding (VRF) address, or a device.

Example 35 is a system as in any of Examples 21-34, wherein the instructions further comprise receiving an ADD or DELETE operation associated with the route, and wherein the method further comprises updating the route store in accordance with the ADD or the DELETE operation.

Example 36 is a system as in any of Examples 21-35, wherein the instructions are such that determining whether any network routing paths have been modified between the existing route and the route comprises: determining whether any routing path that is not present within the existing route has been added to the route; determining whether any routing path present in the existing route has been modified within the route; and determining whether any routing path present in the existing route has been withdrawn in the route.

Example 37 is a system as in any of Examples 21-36, wherein the path configuration key comprises one or more of a device identifier, a Border Gateway Protocol (BGP) path attribute type, or a BGP path attribute value.

Example 38 is a system as in any of Examples 21-37, wherein the path configuration key comprises an indication of one or more BGP prefixes to be tracked.

Example 39 is a system as in any of Examples 21-38, wherein the instructions are such that generating the path configuration key comprises generating a plurality of path configuration keys, and wherein each of the plurality of path configuration keys is associated with one network routing path that has been modified between the existing route and the route.

Example 40 is a system as in any of Examples 21-39, wherein the instructions further comprise identifying at least one path configuration key of the plurality of path configuration keys that matches configuration data for the new path, wherein the configuration data is stored in a configuration store.

Example 41 is a system as in any of Examples 21-40, wherein the instructions further comprise: determining whether the route should be tracked based on user input; in response to determining the route should be tracked, determining whether the route is already stored on a prefix tracker store; in response to determining the route is not already stored on the prefix tracker store, writing to the prefix tracker store to include the route; processing the path configuration key for each of the at least one network routing path; and writing to the prefix tracker store to include the path configuration key for each of the at least one network routing path.

The foregoing description has been presented for the purposes of illustration and description. It is not intended to be exhaustive or to limit the disclosure to the precise form disclosed. Many modifications and variations are possible considering the above teaching. Further, it should be noted that any or all the alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, if any, any future claims submitted here and in different applications, and their equivalents.

It is to be understood that any features of the above-described arrangements, examples, and embodiments may be combined in a single embodiment comprising a combination of features taken from any of the disclosed arrangements, examples, and embodiments.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible considering the above teaching. Further, it should be noted that any or all the alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system comprising:
   a plurality of processors, wherein each processor of the plurality of processors is dedicated to receive one or more of a plurality of input topic streams;
   a plurality of stream stores for storing data, wherein each stream store of the plurality of stream stores is dedicated to store one or more of the plurality of input topic streams; and
   a route processor in communication with each of the plurality of stream stores;
   wherein the route processor determines whether a route for a network topology corresponds with an existing route stored on at least one of the plurality of stream stores;
   wherein the route processor is configured to execute instructions for tracking prefixes within a network topology based on telemetry data;
   wherein the instructions comprise:
      receiving a route for the network topology by way of a route stream of the plurality of input topic streams; and
      determining whether the route corresponds with an existing route stored on a route store of the plurality of stream stores; and
   wherein the instructions further comprise:
      in response to determining the route corresponds with the existing route, determining whether any network routing paths have been modified between the existing route and the route; and
      in response to determining at least one network routing path was modified between the existing route and the route, generating a path configuration key for each of the at least one network routing path.

2. The system of claim 1, wherein the plurality of stream stores comprises a configuration store, and wherein the configuration store is processed by a dedicated configuration processor.

3. The system of claim 2, wherein the configuration store comprises attribute information for a plurality of routes of a network topology, and wherein the attribute information comprises one or more BGP route attributes or a prefix, and wherein the BGP route attributes comprise one or more of community attributes, extended community attributes, or large community attributes.

4. The system of claim 1, wherein the plurality of stream stores comprises a device store, and wherein the device store is processed by a dedicated device processor, and wherein the dedicated device processor is in communication with a device streaming the plurality of input topic streams.

5. The system of claim 4, wherein the device store comprises an indication of which devices within a network topology are tracking prefixes for the network topology.

6. The system of claim 1, wherein the plurality of stream stores comprises a route store, and wherein the route store is processed by the route processor, and wherein the route store comprises information for a plurality of routes of a network topology.

7. The system of claim 1, wherein one or more of the plurality of input topic streams is a stream within a real-time streaming framework.

8. The system of claim 1, wherein each of the plurality of input topic streams receives data pertaining to a network topology in real-time.

9. The system of claim 1, further comprising storing the path configuration key for each of the at least one network routing path on a prefix tracker store, wherein the prefix tracker store is not dedicated to an input topic stream and is independent of the plurality of input topic streams.

10. The system of claim 9, wherein the instructions are such that determining whether the route corresponds with the existing route stored on the route store comprises determining based on data associated with the route, and wherein the data comprises one or more of a prefix, a virtual routing and forwarding (VRF) address, or a device.

11. The system of claim 1, wherein the instructions further comprise
receiving an ADD, UPDATE, or DELETE operation associated with the route; and
updating the route store in accordance with the ADD, the UPDATE, or the DELETE operation.

12. The system of claim 1, wherein the instructions are such that determining whether any network routing paths have been modified between the existing route and the route comprises:
determining whether any routing path that is not present within the existing route has been added to the route;
determining whether any routing path present in the existing route has been modified within the route; and
determining whether any routing path present in the existing route has been withdrawn in the route.

13. The system of claim 1, wherein the path configuration key comprises one or more of a device identifier, a Border Gateway Protocol (BGP) path attribute type, or a BGP path attribute value.

14. The system of claim 1, wherein the path configuration key comprises an indication of one or more BGP prefixes to be tracked.

15. The system of claim 1, wherein the instructions are such that generating the path configuration key comprises generating a plurality of path configuration keys, and wherein each of the plurality of path configuration keys is associated with one network routing path that has been modified between the existing route and the route.

16. The system of claim 1, wherein the instructions further comprise:
determining whether the route should be tracked based on user input;
in response to determining the route should be tracked, determining whether the route is already stored on a prefix tracker store;
in response to determining the route is not already stored on the prefix tracker store, writing to the prefix tracker store to include the route;
processing the path configuration key for each of the at least one network routing path; and
writing to the prefix tracker store to include the path configuration key for each of the at least one network routing path.

* * * * *